(12) United States Patent
Sun et al.

(10) Patent No.: US 12,134,035 B2
(45) Date of Patent: Nov. 5, 2024

(54) METHOD AND SYSTEM FOR A CLOUD NATIVE 3D SCENE GAME

(71) Applicant: WELLINK TECHNOLOGIES CO., LTD., Beijing (CN)

(72) Inventors: Huaqing Sun, Beijing (CN); Jianjun Guo, Beijing (CN)

(73) Assignee: WELLINK TECHNOLOGIES CO., LTD., Beijing (CN)

( * ) Notice: Subject to any disclaimer, the term of this patent is extended or adjusted under 35 U.S.C. 154(b) by 356 days.

(21) Appl. No.: 17/598,004

(22) PCT Filed: Sep. 8, 2020

(86) PCT No.: PCT/CN2020/113894
§ 371 (c)(1),
(2) Date: Sep. 24, 2021

(87) PCT Pub. No.: WO2022/021536
PCT Pub. Date: Feb. 3, 2022

(65) Prior Publication Data

US 2022/0193540 A1 Jun. 23, 2022

(30) Foreign Application Priority Data

Jul. 29, 2020 (CN) .......................... 202010742583.0

(51) Int. Cl.
*A63F 13/355* (2014.01)
*A63F 13/5258* (2014.01)

(52) U.S. Cl.
CPC ........ *A63F 13/355* (2014.09); *A63F 13/5258* (2014.09); *A63F 2300/405* (2013.01); *A63F 2300/6684* (2013.01)

(58) Field of Classification Search
CPC ................ A63F 13/355; A63F 13/5258; A63F 2300/405; A63F 2300/6684; A63F 13/35; A63F 2300/66
See application file for complete search history.

(56) References Cited

U.S. PATENT DOCUMENTS 10,607,437 B2   3/2020  Little et al.
2006/0290700 A1* 12/2006 Gonzalez ............... G09G 5/006
                                                             345/502

(Continued)

FOREIGN PATENT DOCUMENTS

CN   103023872 A   4/2013
CN   103095828 A   5/2013

(Continued)

OTHER PUBLICATIONS

First Office Action, Application No. 202010742583.0, mailed Dec. 30, 2020, 13 pages (translation only).

(Continued)

*Primary Examiner* — Chase E Leichliter
(74) *Attorney, Agent, or Firm* — AEON Law, PLLC; Adam L. K. Philipp; Charlotte E. Holoubek

(57) ABSTRACT

A cloud native 3D scene game and method thereof, including: initiating a game request by one or more users to a cloud server through a game client, creating and starting one corresponding game process according to the game request of the one or more users by the cloud server, and processing the game data of the one or more users at the same time by the game process. The invention has the advantages that: game data of multiple users are processed through one game process, and multiple virtual cameras are controlled to generate corresponding game screens for different users at the same time in one game process which can obviously reduce consumption of server resources and reduce the number of the servers, meanwhile, the fluency of game (Continued)

screens can be guaranteed, the user experience can be improved, and the interaction fluency among different users can be improved.

10 Claims, 4 Drawing Sheets

(56) References Cited

U.S. PATENT DOCUMENTS

| | | | |
|---|---|---|---|
| 2012/0052959 A1 | 3/2012 | Nishida et al. | |
| 2015/0154051 A1* | 6/2015 | Kruglick | H04L 67/565 345/522 |
| 2015/0331813 A1* | 11/2015 | Perrin | H04N 21/4126 345/522 |
| 2015/0367238 A1* | 12/2015 | Perrin | A63F 13/73 463/29 |
| 2016/0059125 A1* | 3/2016 | Georgiev | H04L 69/14 463/31 |
| 2016/0059127 A1* | 3/2016 | Perrin | A63F 13/40 348/180 |
| 2016/0127508 A1* | 5/2016 | Perrin | G06T 19/00 709/219 |
| 2016/0163017 A1* | 6/2016 | Iwasaki | A63F 13/355 345/522 |
| 2016/0210722 A1* | 7/2016 | Fortin | A63F 13/30 |
| 2016/0293134 A1* | 10/2016 | Fortin | A63F 13/355 |
| 2018/0192081 A1* | 7/2018 | Huang | H04N 13/344 |
| 2018/0300930 A1* | 10/2018 | Kennedy | A63F 13/355 |
| 2020/0171382 A1* | 6/2020 | Agoston | G06F 9/5083 |
| 2020/0206619 A1* | 7/2020 | van der Laan | H04N 21/4307 |
| 2022/0193540 A1* | 6/2022 | Sun | A63F 13/5258 |

FOREIGN PATENT DOCUMENTS

| | | |
|---|---|---|
| CN | 106126423 A | 11/2016 |
| CN | 106127844 A | 11/2016 |
| CN | 109840058 A | 6/2019 |
| CN | 110270094 A | 9/2019 |
| CN | 110448894 A | 11/2019 |
| CN | 110548284 A | 12/2019 |
| CN | 111450528 A | 7/2020 |
| IN | 106390450 A | 2/2017 |
| WO | 2012053274 A1 | 4/2012 |

OTHER PUBLICATIONS

Notification to Grant, Application No. 202010742583.0, mailed Apr. 28, 2021, 3 pages (translation only).
PCT International Search Report and Written Opinion, International Application No. PCT/CN2020/113894, mailed Apr. 28, 2021, 15 pages (8 pages of Official copy and 7 pages of English Translation).
Second Office Action, Application No. 202010742583.0, mailed Mar. 18, 2021, 6 pages (translation only).

* cited by examiner

METHOD AND SYSTEM FOR A CLOUD NATIVE 3D SCENE GAME

CROSS-REFERENCE TO RELATED CASES

This application is a U.S. national phase entry of, and claims priority to, PCT International Phase Application No. PCT/CN2020/113894, filed Sep. 8, 2020, which claims priority to Chinese Patent Application No. CN202010742583.0, filed Jul. 29, 2020. The entire contents of the above-referenced applications and of all priority documents referenced in the Application Data Sheet filed herewith are hereby incorporated by reference for all purposes.

FIELD

The present invention relates to the field of cloud games, in particular to a method and system for a cloud native 3D scene game.

BACKGROUND

Virtual machine technology is used in the existing cloud game cloud services. When a cloud server provides game services for multiple users, it usually runs multiple virtual machines on the cloud server, and starts the game in each virtual machine, which belongs to multiple processes, accepting the control instructions separately and processing them separately. The data transmission is a real-time video streaming transmission, which consumes a lot of GPU, CPU and memory of the cloud server, and every time a user is added, the resource consumption of the cloud server will increase exponentially. Moreover, a single cloud server supports a small number of users. The solution to multiple users is to increase the number of servers. As the number of users increases, the cost of manufacturing hardware also increases.

SUMMARY

In order to solve the above problems, the object of the present invention is to provide a game service for multiple clients by creating one game process on the cloud server.

To achieve the above object, the present invention provides a method for a cloud native 3D scene rendering game, the method including: initiating a game request by one or more users to a cloud server through a game client, creating and starting one corresponding game process according to the game request of the one or more users by the cloud server, and processing game data of the one or more users at the same time by the game process.

As a further improvement of the present invention, in the game process, the processing process includes:
  acquiring instruction data of current N users;
  generating game control data under the current instruction according to N instruction data;
  acquiring game data corresponding to each user under the current instruction through the game control data, and rendering the acquired game data corresponding to each user respectively; and
  sending the rendered game screens to the corresponding users respectively.

As a further improvement of the present invention, after the process is initiated, in the game initialization stage, a game engine creates a corresponding number of virtual cameras according to the number of users, each user corresponding to a virtual camera.

As a further improvement of the present invention, the game control data controls virtual cameras corresponding to different users to acquire game screens under the current operation of the users.

As a further improvement of the present invention, after the game data corresponding to the N users are all rendered, the corresponding rendered game screens of all users are spliced to form a complete picture, the picture is acquired and then format-converted and picture-segmented, and the resultant picture formed by the segmentation is the game screen corresponding to each user.

As a further improvement of the present invention, the processing process further includes real-time processing of game audio data, including: during the game process, assigning one sound listener for each user, generating an audio data stream by each sound listener corresponding to each user for its corresponding user, and sending the generated audio data stream to the corresponding user.

As a further improvement of the present invention, when the rendering program renders the game data, multiple virtual cameras share one model manager and texture manager.

As a further improvement of the present invention, when the rendering program renders the game data, each virtual camera is assigned with a separate working thread or a unified thread pool is used for scheduling.

As a further improvement of the present invention, when the rendering program renders the game data, a relative position relationship between multiple virtual cameras is established, and the rendering data of different virtual cameras is multiplexed based on the relative position relationship.

The present invention also provides a system for cloud native 3D scene rendering game, wherein the system includes a client and a cloud server, one cloud server providing services for multiple clients;
  the client is used for acquiring operation data of users and sending the operation data to the cloud server, and receiving a game screen sent by the cloud server and display the game screen; and
  the cloud server is used for creating a game process for multiple users, receiving operation data sent by the multiple clients, and generating a game screen under the current operation for each user according to the operation data, and sending the game screen to the client of the corresponding user.

As a further improvement of the present invention, he client includes a data conversion and sending unit, and the data conversion and sending unit converts user operations into instruction data, and sending the instruction data to the cloud server.

As a further improvement of the present invention, the cloud server encodes the game screen generated for each user and sends it to the client of the corresponding user, and the client receives the encoded game screen sent by the cloud server, and decodes the encoded game screen for displaying.

As a further improvement of the present invention, a 5G network is used to transmit data between the multiple clients and the cloud server.

As a further improvement of the present invention, the client obtains the operation signal by using one of a control handle, a keyboard, a mouse, and a screen touch.

As a further improvement of the present invention, the operating platform of the client is one or more of Windows, Linux, android, and ios.

As a further improvement of the present invention, the game screen received by the client is displayed by one or more of a mobile phone, a tablet, a PC, a network smart TV, and a projector.

The invention has the advantages that: game data of multiple users are processed through one game process, and multiple virtual cameras are controlled to generate corresponding game screens for different users at the same time in one game process. Especially under the condition that the number of the users is large, the present method can obviously reduce consumption of server resources and reduce the number of the servers, meanwhile, the fluency of game screens can be guaranteed, the user experience can be improved, and the interaction fluency among different users can be improved.

DETAILED DESCRIPTION

The technical solutions in the examples of the invention will be clearly and completely described below in conjunction with the accompanying drawings in the examples of the present invention. Obviously, the described examples are only a part of the examples, rather than all the examples, of the present invention. Based on the examples of the present invention, all other examples obtained by those of ordinary skill in the art without creative work shall fall within the protection scope of the present disclosure.

It should be noted that if there is a directional indication (such as up, down, left, right, front, rear . . . ) in the example of the present invention, the directional indication is only used to explain the relative positional relationship, movement, etc. between the components in a specific posture (as shown in the figures). The directional indications will also change accordingly as the specific posture changes.

In addition, in the description of the present invention, the terms used are only for illustrative purposes and are not intended to limit the scope of the present disclosure. The terms "comprise/comprising" and/or "include/including" are used to specify the existence of elements, steps, operations, and/or components, but do not exclude the presence or addition of one or more of other elements, steps, operations, and/or components. The terms "first", "second", etc. may be used to describe various elements, but they neither represent the order nor limit these elements. In addition, in the description of the present invention, unless otherwise specified, the term "plurality" means two or more. These terms are only used to distinguish one element from another. These and/or other aspects will become obvious in conjunction with the following figures, and it is easier for those of ordinary skill in the art to understand the description of the examples of the present invention. The figures are used to depict examples of the present disclosure for illustrative purposes only. Those skilled in the art will easily recognize from the following description that alternative examples of the structure and method shown in the present invention can be adopted without departing from the principles of the present disclosure.

Figure 1:
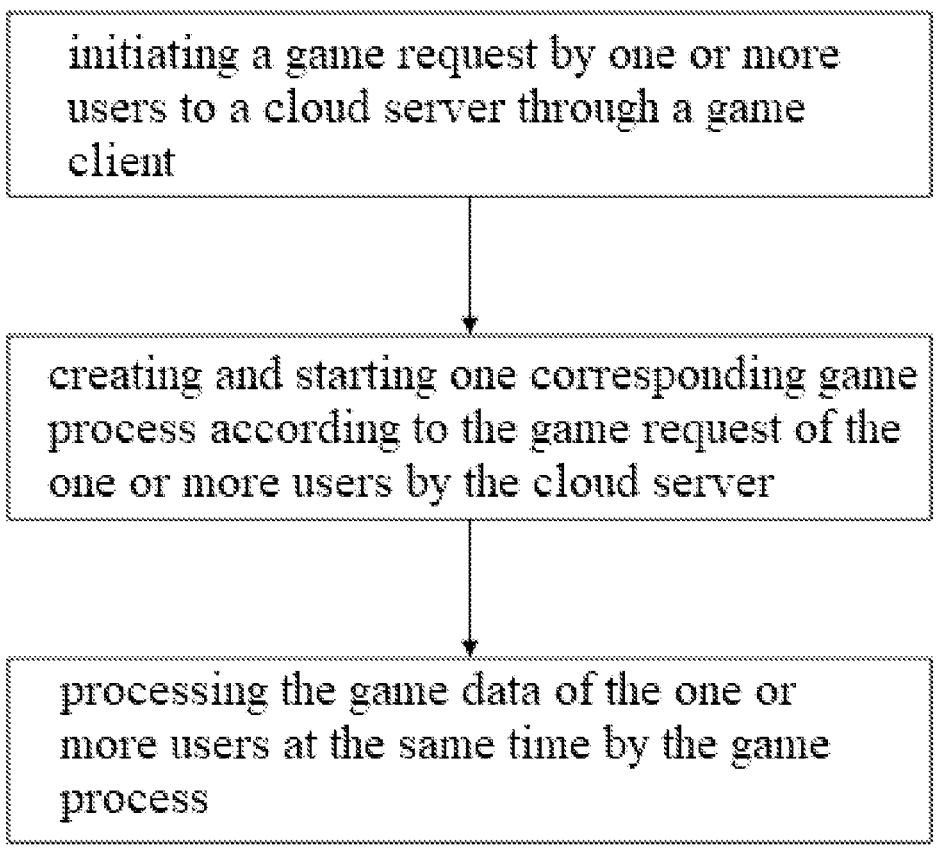
FIG. 1 is a method flowchart of a method for a cloud native 3D scene rendering game according to an example of the present invention.
Figure 2:
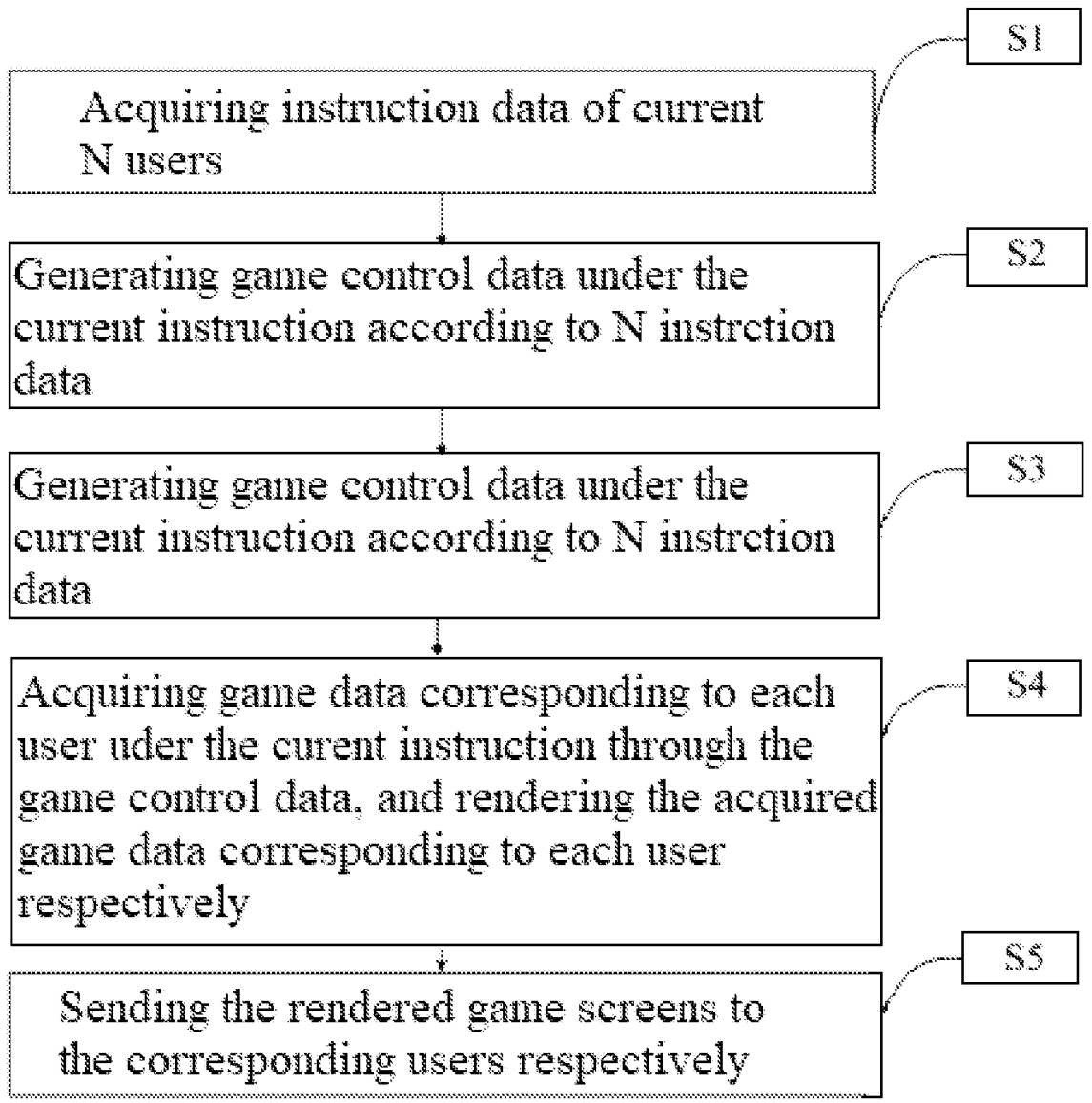
FIG. 2 is a data processing flowchart of a system for cloud native 3D scene rendering game according to an example of the present invention.

According to an example of the present invention, as shown in FIGS. 1-2, a method for a cloud native 3D scene rendering game includes: initiating a game request by one or more users to a cloud server through a game client, creating and starting one corresponding game process according to the game request of the one or more users by the cloud server, and processing game data of the one or more users at the same time by the game process.

In the game process, the processing process includes:
acquiring instruction data of current N users;
generating game control data under the current instruction according to N instruction data;
acquiring game data corresponding to each user under the current instruction through the game control data, and rendering the acquired game data corresponding to each user respectively; and
sending the rendered game screens to the corresponding users respectively.

The game process acquires the operation instruction data of each user in real time, and generates a frame of game screen under the current instruction data for each user by using the current instruction data of the users. The game screens of each user are transmitted to the client of the users through the network after rendering, compression and coding processing, making user operation and screen display have instant interactivity.

In an alternative embodiment, after the process is initiated, in the game initialization stage, the game program creates a corresponding number of virtual cameras according to the number of users, each user corresponding to a virtual camera The virtual camera is used for acquiring the game screens of the corresponding users and rendering the game screens by calling a rendering program.

Among them, the control of the game control data includes control of the position of the virtual camera in the game scene (acquiring the position and angle of view of the user in the game scene) and control of the rendering result of the acquired game screen.

In order to further improve the real-time performance of the game and avoid delays, the rendering process of the game screen can be optimized:

In an alternative embodiment, before rendering, objects outside the screen, occluded elements and the back of the screen are eliminated, thereby reducing the amount of rendering of each frame of the game screen and improving the rendering speed.

In an alternative embodiment, when rendering is performed, multiple virtual cameras share one model manager and texture manager to avoid repeated loading of resources; each virtual camera is assigned with a separate working thread or a unified thread pool is used for scheduling, making full use of CPU resources and improving the rendering speed.

In an alternative embodiment, a relative position relationship between multiple virtual cameras is established, and the rendering data of different virtual cameras is multiplexed based on the relative position relationship. The multiplexing includes: multiplexing of screen space reflection rendering results, multiplexing of dynamic shadow maps and multiplexing of lighting results to improve the rendering speed.

In an alternative embodiment, static shadow maps are used for static light source scenes.

In an alternative embodiment, the rendering sequence of the virtual cameras is calculated. Under the condition that the line-of-sight directions of the two virtual cameras are substantially parallel, the virtual camera at the rear relative position can multiplex the rendering result of the front virtual camera. Similarly, the front virtual camera directly crops out the part of the rendering result of the rear virtual camera that belongs to its own field of view. In this way, when the conditions match, the rendering times can be reduced and the rendering speed can be improved.

In an alternative embodiment, after rendering, the corresponding rendered game screens of all users are spliced to form a complete picture, the spliced picture is acquired and converted to RGB32 format, and the converted picture is segmented. Segmentation is based on the user's corresponding game screen before segmentation, and each user corresponds to a segmented screen. The segmented game screen is consistent with the game screen acquired by the user's corresponding virtual camera, that is, the user's current game screen. The rendered game screen is acquired by taking access to the graphics API, and the acquired screen is redirected to the video editor to facilitate further processing, such as splicing, compression, segmentation, and sending, of the game screen.

Figure 3:
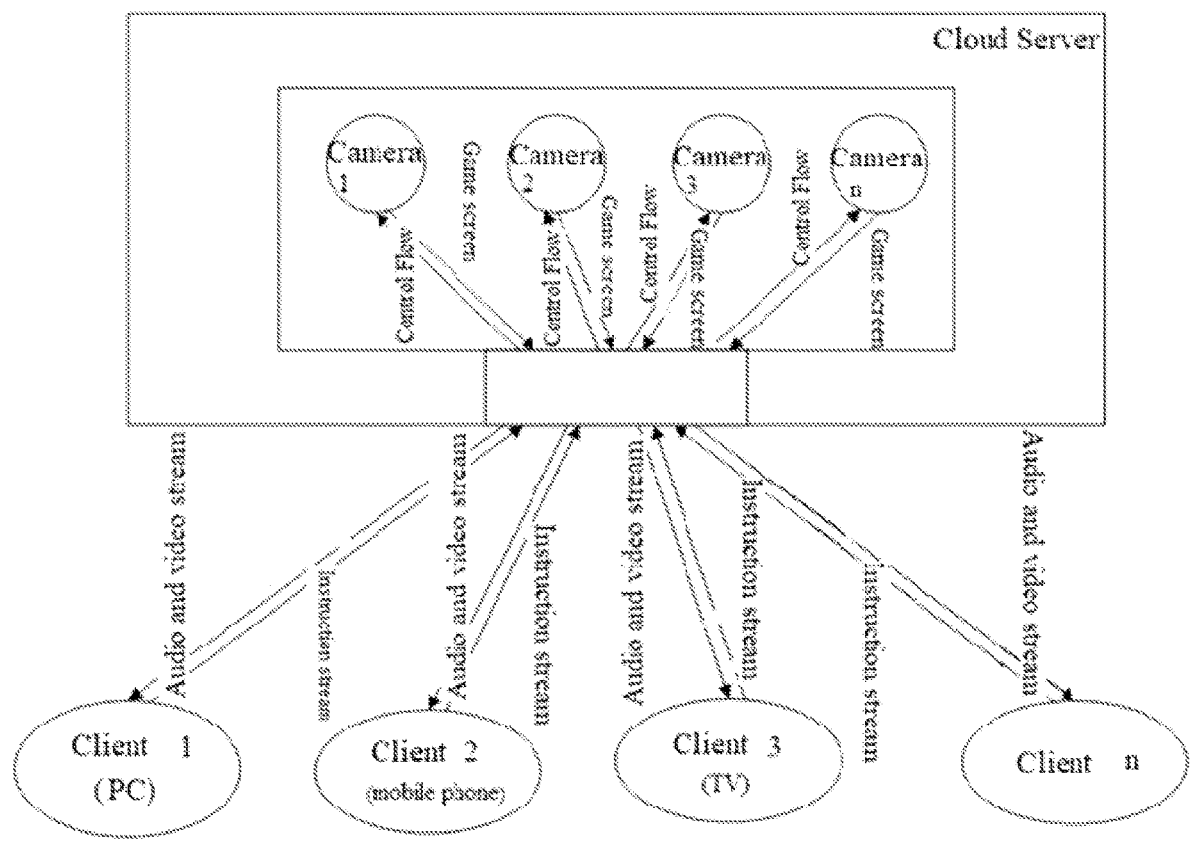
FIG. 3 is a schematic structural diagram of a system for cloud native 3D scene rendering game according to an example of the present invention.
Figure 4:
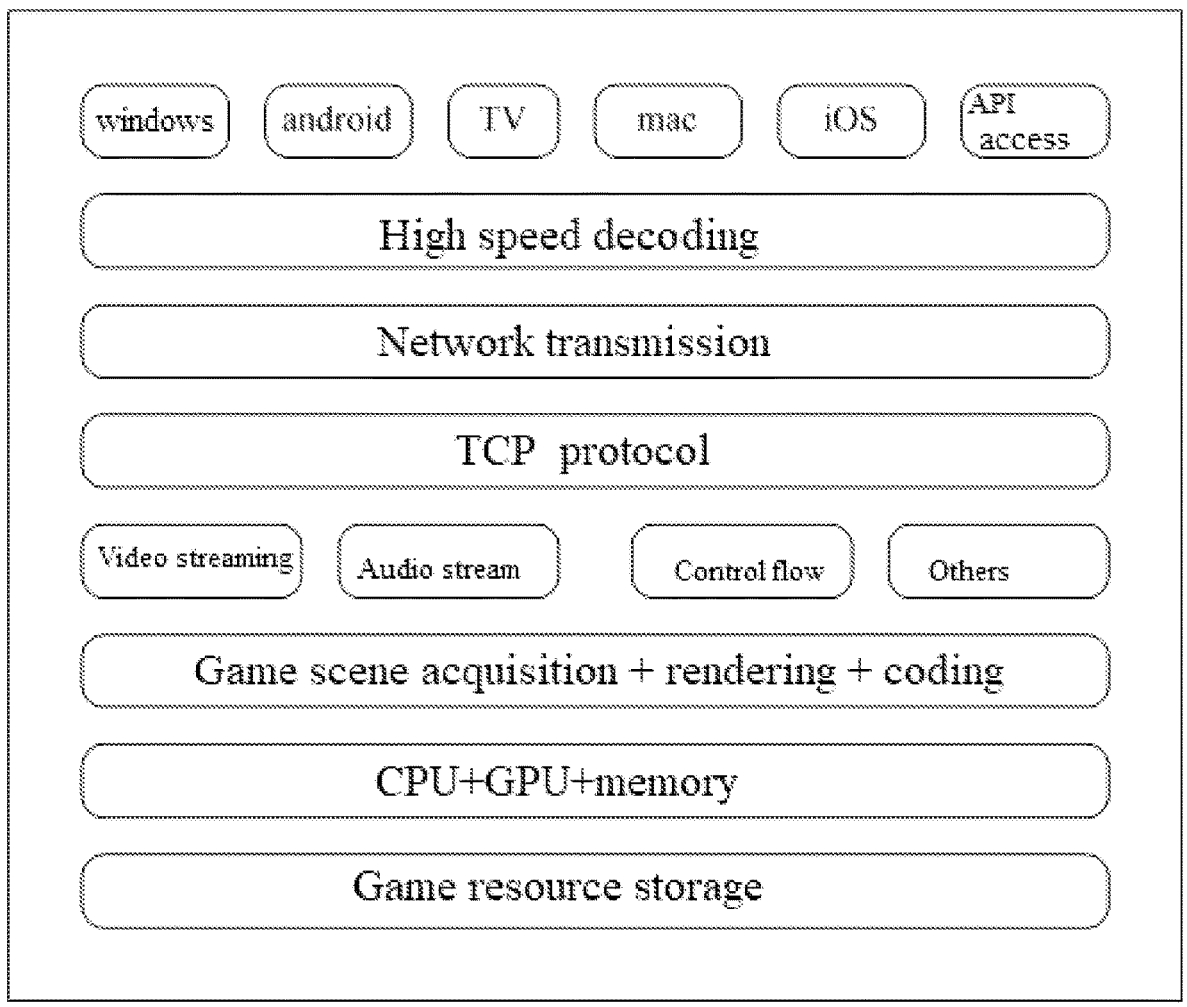
FIG. 4 is a schematic diagram of a system architecture of a system for cloud native 3D scene rendering game according to an example of the present invention.

In an alternative embodiment, the processing process further includes real-time processing of game audio data, including: during one game process, assigning one sound listener to each user, generating an audio data stream by each sound listener corresponding to each user for its corresponding user, and sending the generated audio data stream to the corresponding user. The specific process is as follows: assigning one sound listener to each of multiple users in the game, when a 3D sound source is playing, calculating the sound attenuation according to the distance between the sound source and the sound listener and the Doppler effect, and combining the sound source data information at the same time, finally performing parsing to generate the audio data stream that the corresponding user can hear, and then distributing the different data streams to the corresponding user's client. The user's client finally parses the received audio content to allow user to hear the sound, solving the problem that the audio cannot be received correctly in multiplayer cloud games, According to an example of the present invention, as shown in FIG. 3-4, a system for cloud native 3D scene rendering game, the system includes a client and a cloud server, one cloud server providing services for multiple clients;

the client is used for acquiring operation data of users and sending the operation data to the cloud server, and receiving a game screen sent by the cloud server and display the game screen; and the cloud server is used for creating a game process for multiple users, receiving operation data sent by the multiple clients, and generating a game screen under the current operation for each user according to the operation data, and sending the game screen to the client of the corresponding user.

In an alternative embodiment, the client includes a data conversion and sending unit, and the data conversion and sending unit converts user operations into instruction data, and sending the instruction data to the cloud server.

The cloud server encodes the game screen generated for each user and sends it to the client of the corresponding user, and the client receives the encoded game screen sent by the cloud server, and decodes the encoded game screen for displaying.

In an alternative embodiment, a 5G network is used to transmit data between the multiple clients and the cloud server, for example. The transmission network in the present invention is not specifically limited, but the selection of the transmission network should meet the data transmission requirements of the network game and avoid network delays which cause the game screen to be unsmooth and reduce user experience.

An implementation process of the example of the present invention is as follows:

One or more users initiate a game request to a cloud server through a game client, and the cloud server creates and initiates one corresponding game process according to the game IDs of the multiple users.

In the game initialization phase, the game program adds a corresponding number of virtual cameras to the game scene according to the number of users. Each virtual camera corresponds to one user. The game screen seen by the virtual camera is the screen that the user needs to receive.

After the initialization is completed and the game starts, the client acquires the user's operation data, which is converted into instruction data by the client and transmitted to the game cloud server. The cloud server generates corresponding game control data according to the instruction data and applies it to the game control system, so as to achieve user control of the game. At the same time, feedback of the corresponding elements in the game scene is generated. At this time, each virtual camera will see different picture feedback according to its position and angle of view in the game scene. The rendering program renders the game screen seen by each virtual camera. The program first splices the rendered multiple game screens into one picture to display and output through the graphics card, and then intercepts a series of rendering interfaces of the dircectX layer through the hook method to obtain screen data, and converts the obtained screen data into RGB32 Format, and segmentates the converted picture data and compress it into multiple H265 video data packets. Moreover, in order to reduce the delay, the video encoder is modified to exclude B-frames, and a larger GOP setting is used to reduce the proportion of I-frames, to ensure that the bit rate consumed by each frame is within a maximum controllable range; 0 delay setting ensures that every time a frame of data is input, the encoder will immediately output the encoded data of this frame, avoiding the encoder to buffer the frame data. Each segmented video data packet corresponds to one user, and the video data packet is sent to the corresponding user's client through the network. The client uses the built-in video decoding chip of mobile phones, PADs, PCs, network smart TVs or projectors to decode from Network video data packets, and calls the fastest video display method at the bottom of the client system to display the decoded video frame, that is, the game screen.

The speed of the game screen acquired by the game system of the present invention can be as low as 6 ms, which can ensure the smoothness of the game screen and the immediacy of user operation feedback, and almost no CPU resources are consumed. Each cloud server can support multiple users simultaneously online. Compared with the condition that one server only serves one user, or a single server supports multiple concurrent games, the cloud native 3D scene game system of the present invention does not require any virtual system and virtual container. By using a single-process, single-rendering way which supports multiple outputs, the GPU, CPU, and memory resources of the cloud server can be more saved. The maximum number of users supported by a cloud server is many times the number of users using multi-process concurrent games, which greatly saves the hardware cost of the cloud server.

That is, those skilled in the art can understand that all or part of the steps in the method of the above-mentioned examples can be implemented by a program instructing relevant hardware. The program is stored in a storage medium and includes several instructions to enable a device (which may be a single-chip microcomputer, a chip, etc.) or a processor to execute all or part of the steps of the methods described in each example of the present application. The aforementioned storage media include: U disks, mobile hard disks, Read-Only Memory (ROM), Random Access Memory (RAM), magnetic disks or optical disks and other media that can store program codes.

In the specification provided hereby, a lot of specific details are explained. However, it can be understood that the examples of the present disclosure can be practiced without these specific details. In some instances, well-known methods, structures and technologies are not shown in detail so as not to obscure the understanding of this specification.

In addition, those of ordinary skill in the art can understand that although some examples described hereby include certain features included in other examples but not other features, the combination of features of different examples means that they are within the scope of the present invention and form different examples. For example, in the claims, any one of the claimed examples can be used in any combination.

Those skilled in the art should understand that although the present disclosure has been described with reference to exemplary examples, various changes can be made and equivalents can be substituted for its elements without departing from the scope of the invention. In addition, without departing from the essential scope of the present invention, many modifications can be made to adapt a particular situation or material to the teaching of the present invention. Therefore, the present invention is not limited to the specific examples disclosed, but the present invention will include all examples falling within the scope of the appended claims.

The invention claimed is:

1. A method for a cloud native 3D scene rendering game, the method including: initiating a game request by one or more users to a cloud server through a game client, creating and starting one corresponding game process according to the game request of the one or more users by the cloud server, and processing game data of the one or more users at the same time by the game process,
wherein a corresponding number of virtual cameras are created according to the number of users, and
when rendering is performed, multiple virtual cameras share one model manager and texture manager to avoid repeated loading of resources: each virtual camera is assigned with a separate working thread or a unified thread pool is used for scheduling, making full use of CPU resources and improving the rendering speed.

2. The method for a cloud native 3D scene rendering game according to claim 1, wherein in the game process, the processing process includes:
acquiring instruction data of current N users;
generating game control data under the current instruction according to N instruction data;
acquiring game data corresponding to each user under the current instruction through the game control data, and rendering the acquired game data corresponding to each user respectively; and
sending game screens obtained after rendering to the corresponding users respectively.

3. The method for a cloud native 3D scene rendering game according to claim 2, wherein after the process is initiated, in the game initialization stage, the game program creates a corresponding number of virtual cameras according to the number of users, each user corresponding to a virtual camera.

4. The method for a cloud native 3D scene rendering game according to claim 2, wherein the game control data controls virtual cameras corresponding to different users to acquire game screens under the current operation of the users.

5. The method for a cloud native 3D scene rendering game according to claim 2, wherein after the game data corresponding to the N users are all rendered, the corresponding game screens obtained after rendering of all users are spliced to form a complete picture, the picture is acquired and then format-conversed and picture-segmented, and the resultant picture formed by the segmentation is the game screen corresponding to each user.

6. The method for a cloud native 3D scene rendering game according to claim 2, wherein the processing process further includes real-time processing of game audio data, including: during the game process, assigning one sound listener for each user, generating an audio data stream by each sound listener corresponding to each user for its corresponding user, and sending the generated audio data stream to the corresponding user.

7. A system for cloud native 3D scene rendering game, wherein the system includes a client and a cloud server, one cloud server providing services for multiple clients;
the client is used for acquiring operation data of users and sending the operation data to the cloud server, and receiving a game screen sent by the cloud server and display the game screen; and
the cloud server is used for creating a game process for multiple users, receiving operation data sent by the multiple clients, and generating a game screen under the current operation for each user according to the operation data, and sending the game screen to the client of the corresponding user;
wherein the system is configured to initiate a game request by one or more users to the cloud server through the client, to create and start one corresponding game process according to the game request of the one or more users by the cloud server, and to process game data of the one or more users at the same time by the game process,
wherein a corresponding number of virtual cameras are created according to the number of users, and
when rendering is performed, multiple virtual cameras share one model manager and texture manager to avoid repeated loading of resources, each virtual camera is assigned with a separate working thread or a unified thread pool is used for scheduling, making full use of CPU resources and improving the rendering speed.

8. The system for a cloud native 3D scene rendering game according to claim 7, wherein the client includes a data conversion and sending unit, and the data conversion and sending unit converts user operations into instruction data, and sending the instruction data to the cloud server.

9. The system for cloud native 3D scene rendering game according to claim 7, wherein the cloud server encodes the game screen generated for each user and sends it to the client of the corresponding user, and the client receives the encoded game screen sent by the cloud server, and decodes the encoded game screen for displaying.

10. The system for cloud native 3D scene rendering game according to claim 7, wherein a 5G network is used to transmit data between the multiple clients and the cloud server.

* * * * *